United States Patent
Evans

[11] 4,000,074
[45] Dec. 28, 1976

[54] CENTRIFUGE HAVING AN INNER, INVERTIBLE, FUNNEL-LIKE CONTAINER

[75] Inventor: Robert W. Evans, Herndon, Va.

[73] Assignee: The United States of America as represented by the Secretary of the Army, Washington, D.C.

[22] Filed: Sept. 20, 1974

[21] Appl. No.: 507,821

[52] U.S. Cl. .............................. 210/369; 210/393; 233/3; 233/46; 233/47 R
[51] Int. Cl.² ................. B01D 33/10; B01D 35/00; B01D 35/22
[58] Field of Search .......... 210/360 R, 360 A, 350, 210/408, 410, 411, 362, 364, 365, 367, 369, 372, 373, 376, 379, 393; 233/46, 3, 22, 27, 1 R; 68/23.3; 34/58; 162/384

[56] References Cited
UNITED STATES PATENTS

| | | | |
|---|---|---|---|
| 1,415,939 | 5/1922 | Mabry | 210/373 |
| 1,903,298 | 4/1933 | Roberts | 210/368 |
| 2,548,417 | 4/1951 | Baxter | 210/373 |
| 2,686,595 | 8/1954 | Cox | 210/376 |
| 2,792,172 | 5/1957 | Tait | 210/360 R |
| 2,932,401 | 4/1960 | Tholl | 210/369 |
| 3,367,506 | 2/1968 | Rosaen | 210/408 |
| 3,797,662 | 3/1974 | Titus | 210/360 |

FOREIGN PATENTS OR APPLICATIONS

| | | | |
|---|---|---|---|
| 1,143,149 | 1/1963 | Germany | 68/23.3 |
| 1,432,902 | 8/1971 | Germany | 68/23.3 |
| 1,021,546 | 12/1957 | Germany | 68/23.3 |

*Primary Examiner*—Frank W. Lutter
*Assistant Examiner*—Frank Sever
*Attorney, Agent, or Firm*—Nathan Edelberg; A. Victor Erkkila

[57] ABSTRACT

Primary explosives, e.g. lead azide, dispersed in a liquid medium, e.g. ethanol, are filtered, washed and dried in a novel centrifuge, wherein the rotatable extractor basket has an open bottom, which is closed by peripheral attachment to the large open end of an invertible funnel. The small open end of the funnel is attached to an axial shaft, which can be raised and lowered, whereby said small open end can be held upright to retain the contents in said basket and lowered to invert the funnel to discharge the dried free-flowing explosive particles by gravity through said small open end.

10 Claims, 2 Drawing Figures

4,000,074

CENTRIFUGE HAVING AN INNER, INVERTIBLE, FUNNEL-LIKE CONTAINER

GOVERNMENTAL INTEREST

The invention described herein was made under a contract with the U.S. Government.

BACKGROUND OF THE INVENTION

The present invention is directed to improvements in the current "backline" operations, wherein primary explosives, e.g. lead azide, lead styphnate and tetracene, are transferred from shipping containers, processed, i.e., filtered, washed and dried, and transferred to the bowls used in loading of detonators and similar devices.

The backline operations are essentially the same for all primary explosives and these procedures have changed only slightly since these explosives were first used in military items. The current process is relatively time-consuming, expensive, and because of the nature of the process is hazardous to personnel working on the backline.

At present, the backline operation is a batch process performed manually in a series of separated small buildings using laboratory sized equipment. Lead azide and lead styphnate are shipped in drums with up to 150 pounds of explosive contained in a large rubber (or plastic) bag packed in sawdust wet with a water-alcohol solution in an outer burlap bag. The large rubber (or plastic) bag contains from 2 to 14 bags of explosives (the number and weight of explosives in these inner bags depends on the vendor) commonly containing from 10 to 25 pounds of explosives.

Tetracene is shipped in a 30-gallon metal container with two 12.5-pound bags of tetracene inside one large bag. Packing material is the same as for lead azide and lead styphnate, sawdust, and a water-alcohol solution.

In present operations, the outer bag is opened, sawdust and water removed, the rubber (or plastic) bag opened, and an inner bag is transferred to a container enough liquid to cover the bag. When ready to process, the bag (kept wet with alcohol) is kneaded to break up lumps and the explosive is transferred from the bag. All packing material is returned to the shipping drum and a kill solution added. After an appropriate waiting period, the drum is moved to a disposal area and the contents discarded.

After removal from the bag, approximately 2 pounds of the explosive is transferred (in some cases directly from the bag) to a large Buchner filter, the water-alcohol removed and the resultant cake washed with ethanol to remove the water, taking care to ensure that the wash liquid goes through the explosive and that explosive is not allowed to dry out in a filter. The damp explosive is transferred to drying tubes after manually breaking up the filter cake.

After drying at 120° F., the explosive is transferred to the screening building where it is remotely transferred to a conical cloth screen (jelly bag). Screening is accomplished by up and down movement of the conical cloth screen and the screened explosive goes into an approximately 2-pound container. The next operation in the case of lead azide to be used in detonators and similar items is rebowling in which 2 pounds of lead azide is transferred to the smaller cups used on the detonator loading line or machines. Lead azide is to be used in blends; lead styphnate and tetracene are not rebowled and stay in the 2-pound containers until weighed remotely.

SUMMARY OF THE INVENTION

An object of the present invention is to provide an improved method and apparatus for filtering, washing and drying primary explosives, which avoids the hazardous, costly and time-consuming operations associated with operations currently practiced in the art.

In accordance with the present invention, primary explosives, such as lead azide and the like, which are slurried in a liquid medium, e.g. aqueous ethanol, are filtered, washed and dried in a novel centrifuge, wherein the extractor basket is provided with an invertible funnel-like container for collecting and dicharging the dried explosive produced as free-flowing particles. The extractor basket has an open bottom, which is closed by peripheral attachment to the large open end of the funnel-like container, which has a small open end attached to an axially aligned movable shaft. During operation of the centrifuge the shaft holds the small open end of the funnel upright, whereby the contents are retained in the basket and container. At the end of the drying cycle, the shaft moves downwardly to invert the funnel, thereby permitting the dried, free-flowing explosive particles produced to discharge by gravity through the small open end of the funnel. The centrifuge is provided with conduits for introducing the slurry, wash liquor and drying gas into the extractor basket.

By means of the present method and apparatus, primary explosives can be filtered, washed and dried rapidly and safely to produce and discharge a free-flowing product, which does not require screening and can be directly loaded into "scooping" bowls for final loading operations.

DETAILED DESCRIPTION OF THE INVENTION

Figure 1:
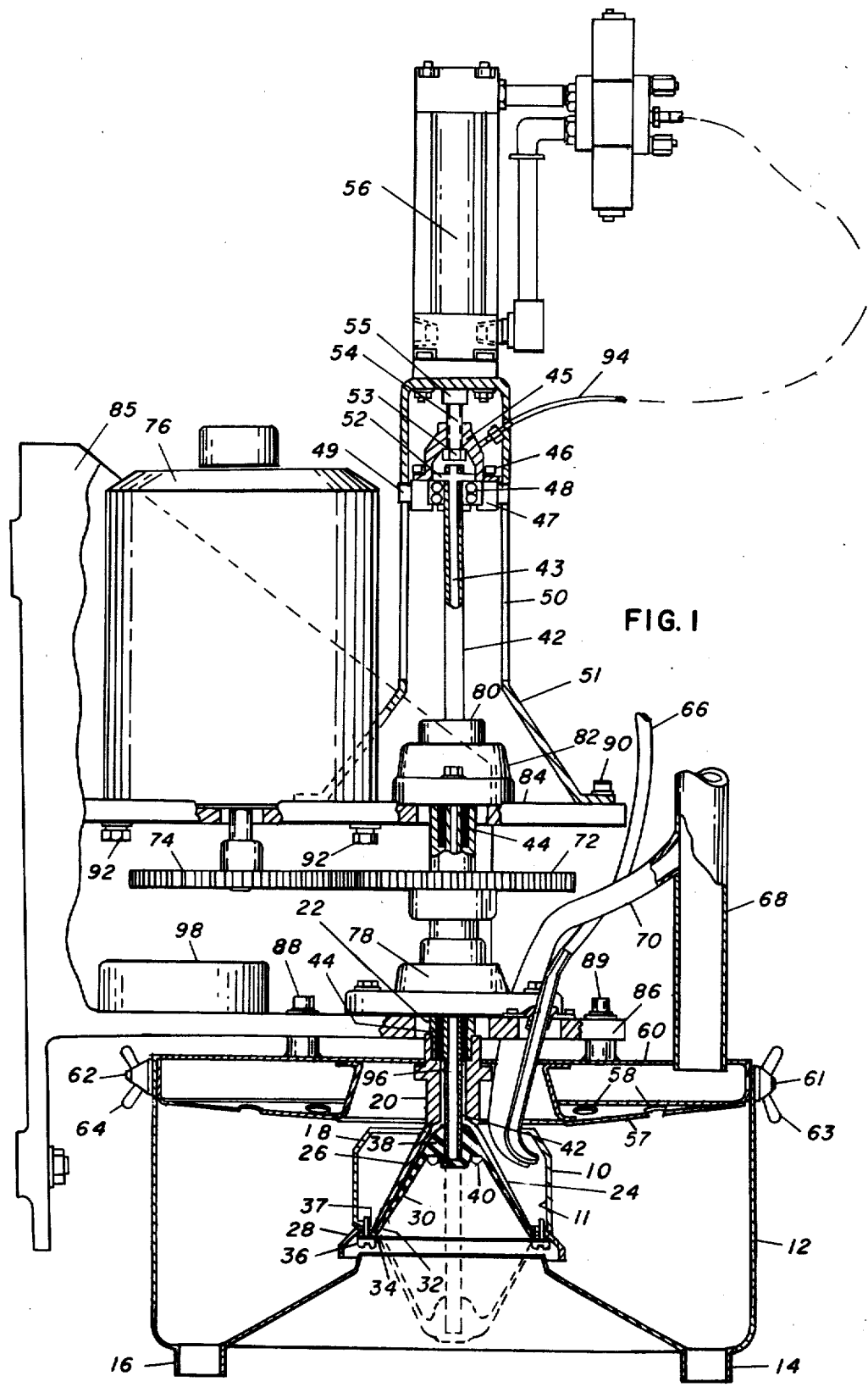
FIG. 1 is a cross-sectional view in partial cutaway of an embodiment of the novel centrifuge apparatus of the present invention.
Figure 2:
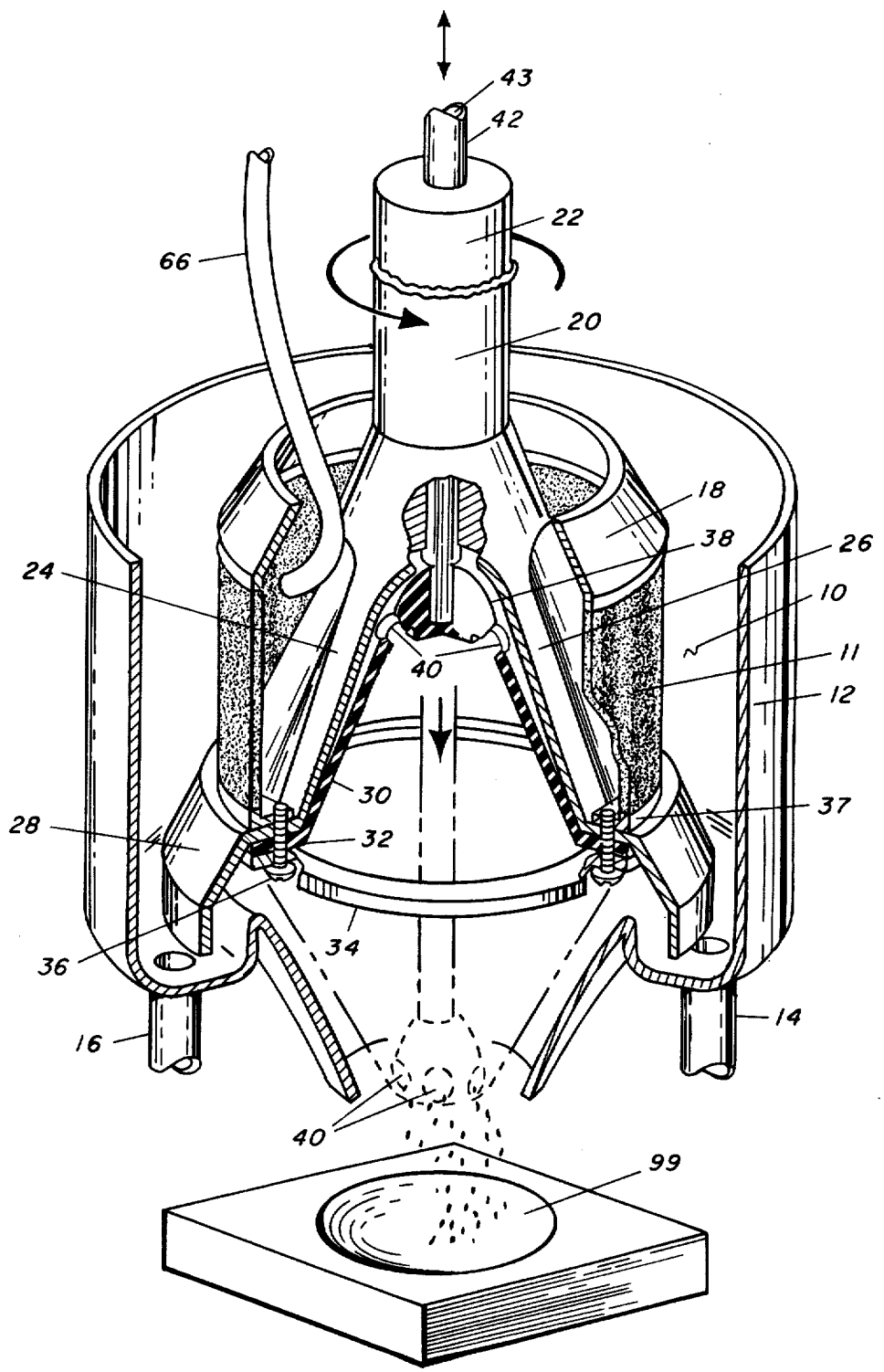
FIG. 2 is a perspective, cutaway view of a novel centrifuge apparatus of the type illustrated in FIG. 1.

Referring to the figures, wherein like reference numerals refer to like parts, a cylindrical stainless steel extractor basket 10 having porous wall 11 is positioned within the cylindrical residue pan or bowl 12 of stainless steel having drain ports 14 and 16. The extractor basket contains a lip 18 for preventing spillover of contents and is attached to a wheel-like member comprising a hub 20, which is welded to a hollow tubular vertical drive shaft 22 and has four symmetrically spaced spoke members 24 and 26 (only two are shown) attached to a ring 28. An invertible funnel-like inner container or boot 30 of a strong, flexible silicone rubber material is peripherally held at its large open end 32 between the wheel ring 28 and a boot retaining ring 34 by means of machine screws 36, which also attach said rings to the rim 37 of the cylindrical basket 10 thereby closing the open bottom of basket 10. The small end 38 of boot 30 is provided with discharge ports 40 and is attached to the lower end of hollow dump shaft 42, which possesses a coaxial passage 43. Dump shaft 42 is coaxially positioned in hollow drive shaft 22 and provided with bushings 44. The upper end of shaft 42 is held in a bell-shaped housing 45 attached by bolts 46 to a bearing retainer 47, which contains ball bearings 48 and is provided with projections 49, which ride in guide channels 50 in frame 51. Dump shaft 42 is supported by retainer ring 52 and rotates with drive shaft 22 to which it is connected by said funnel and wheel members. The upper end of the housing 45 is fastened by a lock nut 53 to the threaded arm 54 of a pneumatically operated piston 55 in cylinder 56 adapted to raise and lower the dump shaft 42. A tray 57 containing openings 58 is attached to bowl cover assembly 60 by means of four equally spaced screws 61 and 62 and wing nuts 63 and 64 (only two of each are shown). A conduit 66 is provided for introducing liquid explosive slurry and wash liquor at the inner wall of extractor basket 10. A conduit 68 is connected to cover bowl assembly 60 for introducing heated drying gas into the plenum through the openings 58 of tray 57, and is provided with a branch conduit 70 for directing part of such drying gas at the inner wall of the extractor basket. Drive shaft 22 is rotated by attached gear 72, which engages the drive gear 74 of motor 76. Shaft 22 is also provided with self-aligning ball bearings 78 (not detailed) and is supported in position by flange 80 which rests on shoulder block 82 mounted on shelf 84 of support structure 85. The centrifuge bowl cover assembly 60 is mounted on shelf 86 of support structure 85 with four screws 88, 89 (only two are shown), while motor 76 and frame 51 are mounted on shelf 84 with screws 90 and 92, respectively (not all are shown). A vibrator 98 is mounted on shelf 86 to transmit vibrations to the extractor basket 10 for dislodging and discharging adhering dry explosive particles from said basket and funnel-like boot 30. A conduit 94 is connected to the bell-shaped housing 45 for introducing a stream of air through the coaxial passage 43 of dump shaft 42 and lateral ports 96 in the lower part thereof, which communicates with the clearance provided between the outer wall of dump shaft 42 and the inner walls of hollow wheel hub 20 and drive shaft 22, whereby any particles of explosive entering said clearance during processing are blown back into the basket by the air stream and thus prevented from forming dangerous accumulations and/or penetration into friction areas between the inner shaft 42, outer shaft 22, and hollow wheel hub 20.

In operation the extractor basket is rotated at high speed via drive shaft 22. During the filtration, washing and drying cycles the funnel-like boot 30 is held in upright position within basket 10 by dump shaft 42, as shown in FIG. 1. The slurry of solid explosive particles is fed through conduit 66 into the extractor basket 10, wherein the liquid is removed through the pores of wall 11 and the solid explosive particles are retained on said wall. A suitable wash liquid is then introduced through conduit 66 to wash the explosive and to displace the liquor adhering to the solid explosive, after which heated air, nitrogen or other suitable gas is introduced through conduits 68 and 70 to effect drying of the solid explosive to a free-flowing powder. The size, shape and position of the orifices of the liquid and gas conduits within the basket can be adjusted to provide the maximum contact of the wash liquor and drying gas with the solid explosive. At the conclusion of the drying cycle, the funnel 30 is inverted to the position shown by dotted lines in FIG. 1 by forcing dump shaft 42 downward by means of pneumatically operated piston 55, whereby the free-flowing powdered explosive drops through discharge ports 40 at the narrow end of funnel 30 to a loading bowl 99 or other suitable receiver used in loading of primary explosives, detonators, etc.

The centrifugal extractor basket, which can have any suitable size and configuration, e.g. bowl or cylindrical shape, possesses an open bottom such that the dried explosive particles can be discharged therefrom when the aforesaid flexible funnel-like container attached to the open bottom thereof is inverted. The funnel-like container can be peripherally attached in any suitable manner at its large open end to the open bottom of the extractor basket and at its small open end to the shaft adapted to invert same so as to discharge the dry explosive particles therefrom at the end of the final cycle. The funnel-like container can be fabricated of a flexible material, e.g. natural or synthetic rubber, cloth, etc., preferably a "conductive" rubber or a material whose surface has been treated so as to reduce buildup of static electricity, which could otherwise be hazardous in view of the possibility that the container might rub against metal parts.

Primary explosives, particularly lead azide which is the primary explosive used in the largest quantities, are generally loaded in front line operations by automatic machinery or at hand-loading stations into detonators, etc., from a container containing 2 ounces or less of such explosive. The following example illustrates the use of the present invention in which lead azide is processed in separate portions of approximately 50 grams each (about 2 ounces), whereby safety of operation is improved without loss of efficiency or quality of explosive product produced, as compared with current backline operations.

The centrifuge of the foregoing type employed in the example possessed a cylindrical extractor basket which had an inside diameter of 4.5 inches and pores of 10 mu diameter, and was rotated at 1000 rpm. Dextrinated lead azide, as received, was mechanically mixed with 95% ethanol to produce a uniform slurry containing approximately 5% by weight of the lead azide. About one liter of the slurry containing 50 grams of the lead azide was transferred into the centrifuge during 1 minute through ½ inch I.D. Tygon Tubing by means of peristaltic pump. When the transfer was complete, the basket was spun for 30 seconds. A wash of 500 ml. of anhydrous methanol was then pumped into the basket during 30 seconds to displace adhering ethanol and water, after which the basket was spun for 30 seconds. A wash of 500 ml. of trichlorotrifluoroethane, marketed under the trademark Freon 113 by E. I. du Pont de Nemours & Co., was then pumped into the basket during 30 seconds, after which the basket was spun for 2 minutes while introducing a current of hot air (about 180° F.) to dry the lead azide. The rotation of the basket was then stopped, and the contents thereof were discharged in about 15 seconds by inverting the funnel-like container and vibrating the centrifuge, as described above. The lead azide was recovered essentially quantitatively as a free-flowing powder free from agglomerates. The amount of lead azide lost in the waste wash liquors was negligible (It varied from 0.04 to 0.08 grams per liter of waste wash liquor over a number of repetitive runs in the foregoing manner, based measurement of the observed gas evolution after addition of an excess of ceric ammonium nitrate).

The characteristics of the lead azide crystals thus produced were similar to those of lead azide obtained by normal backline methods. When the product was incorporated in a 50% lead azide - 50% aluminum blend used as the output charge for a delay primer, no loading problems were encountered and the output of the item was the same as that of the item containing normally processed dextrinated lead azide.

The total time required for processing a slurry of 2 ounces of dextrinated lead azide to a dry, free-flowing product as described above was approximately 5 minutes. A longer processing time was required when the Freon wash was omitted and/or the drying gas employed was heated to a lower temperature.

When one liter containing 20 grams of tetracene slurried in ethanol was processed in the foregoing manner except that the final spin was increased to about 2.5 minutes, the tetracene was recovered essentially quantitatively as a free-flowing product.

In another experiment one liter containing 25 grams of lead styphnate slurried in ethanol was processed in the foregoing manner except that 95% ethanol was employed as wash liquid in place of anhydrous methanol and the final spin period was increased to about 4 minutes. In two runs made in this modified manner, 25.0 grams of free-flowing lead styphnate product were dumped at the end of the final cycle in the first run and 24.0 grams in the second.

It is thus evident that by using several centrifuges of the present invention and processing small (e.g. 2 ounce) batches of slurried explosive in the manner described above, it is possible to process a bag containing up to 25 pounds of primary explosive per hour to consistently produce a dry, free-flowing explosive equal to that obtained by present backline operations while substantially reducing operating costs and hazards. The individual centrifuges and storage tanks with associated equipment, e.g. stirrers, pumps, etc., can be separated behind protective shielding. After transfer of the explosive from shipping bags to the batch tanks, the subsequent operations required to produce about 2 ounces of dry free-flowing primary explosive for loading into explosive items can be performed remotely and automatically.

The foregoing disclosure and drawings are merely illustrative of the principles of this invention and are not to be interpreted in a limiting sense. I wish it to be understood that I do not desire to be limited to exact details of construction shown and described for obvious modifications will occur to a person skilled in the art.

What is claimed is:

1. A centrifuge having separate centrifuging and solids discharge operational modes, for filtering, washing and drying primary explosives comprising in combination:
    a housing;
    a rotatable extractor basket having an open bottom disposed in said housing;
    means for rotating said basket;
    conduits for introducing liquid explosive slurry, wash liquid and gaseous drying medium into said basket;
    outlets in said housing for removing liquid effluents, gaseous drying medium and solid explosive;
    an invertible, funnel-like container having a large open end and a small open end, mounted in said basket;
    means for peripherally attaching the large open end of said funnel-like container to the open bottom of said basket;
    means attached to the small open end of said funnel-like container for holding said small open end above said open bottom and for inverting said funnel-like container, whereby in the centrifuging operational mode said means holds said small open end in an upright position so that the explosive solids are retained in said basket and container while the liquid is removed through the perforate wall of said basket, and in the solids discharging operational mode said means holds the funnel-like container in an inverted position so that the dried explosive can be discharged by gravity through the small open end of said funnel-like container.

2. The centrifuge of claim 1, wherein said funnel-like container is fabricated of natural or synthetic rubber.

3. The centrifuge of claim 1, wherein the means for rotating the extractor basket includes a hollow vertical drive shaft axially attached to said basket and the means attached to the small open end of the funnel-like container includes a shaft axially positioned within said hollow drive shaft.

4. The centrifuge of claim 3, wherein the means for peripherally attaching the large open end of said funnel-like container to the open bottom of said basket includes a wheel having a central hub connected by spoke-like members to a ring, wherein said hub is mounted on said drive shaft and said ring is peripherally connected to the bottom of said basket and said container large open end.

5. The centrifuge of claim 4, wherein the large open end of said funnel-like container is tightly held between said wheel ring and a mating ring.

6. The centrifuge of claim 3, wherein the inner shaft is hollow and contains lateral ports to permit introduction of a gas stream through said hollow shaft and ports into the clearance between said inner shaft and said drive shaft, whereby particles of explosive entering said clearance from the extractor basket are removed therefrom by said gas stream.

7. A rotatable extractor basket for a centrifuge having separate centrifuging and solids discharge operational modes, said extractor basket comprising
    an open bottom;
    an invertible funnel-like container having a large open end and a small open end;
    means for peripherally attaching the large open end of said funnel-like container to the open bottom of said basket;
    means attached to the small open end of said funnel-like container for holding said small open end above said open bottom and for inverting said funnel-like container, whereby in the centrifuging operational mode said means holds the small open end in an upright position so that the solids are retained in said basket and container while the liquid is removed through the perforate wall of said basket, and in the solids discharging operational mode said means holds the funnel-like container in an inverted position so that the solids can be discharged by gravity through the small open end of said funnel-like container.

8. The extractor basket of claim 7, wherein the means for peripherally attaching the large open end of said funnel-like container to the open bottom of said basket includes a wheel having a central hub connected by spoke-like members to a ring, wherein said hub is mounted on a shaft for rotating said basket and said ring is peripherally attached to the bottom of said basket and the large open end of said container.

9. The extractor basket of claim 8, wherein the large open end of said funnel-like container is tightly held between said wheel ring and a mating ring.

10. The extractor basket of claim 8, wherein the invertible container is made of a flexible material capable of reducing the buildup of static electricity.

* * * * *